US007286510B2

(12) United States Patent
Wang et al.

(10) Patent No.: US 7,286,510 B2
(45) Date of Patent: Oct. 23, 2007

(54) METHOD AND APPARATUS FOR PROVIDING COMPATIBILITY BETWEEN ELEMENTS OF A WIRELESS COMMUNICATION SYSTEM

(75) Inventors: Jun Wang, San Diego, CA (US); Raymond T. Hsu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1049 days.

(21) Appl. No.: 10/123,727

(22) Filed: Apr. 15, 2002

(65) Prior Publication Data

US 2003/0193909 A1 Oct. 16, 2003

(51) Int. Cl.
*H04Q 7/20* (2006.01)
*H04Q 7/24* (2006.01)

(52) U.S. Cl. .................................. 370/338; 455/435.1

(58) Field of Classification Search ..................... None
See application file for complete search history.

(56) References Cited

U.S. PATENT DOCUMENTS 6,061,650 A * 5/2000 Malkin et al. .............. 370/401
6,571,289 B1 * 5/2003 Montenegro ................ 709/227
6,987,771 B2 * 1/2006 Shimizu et al. ............. 370/401
2003/0074452 A1 * 4/2003 Zheng et al. .............. 709/228
2003/0219000 A1 * 11/2003 Magret ...................... 370/338

FOREIGN PATENT DOCUMENTS

EP 1 161 032 A2 12/2001

OTHER PUBLICATIONS

C. Perkins, "IP Mobility Support IPv4, draft-ietf-mobile-rfc2002-bis-08.txt," Internet Engineering Task Force Internet Draft, Sep. 19, 2001, pp. 1-95.
Network Working Group, Standards Track, "IP Mobility Support," C. Perkins, Editor, IBM, Oct. 1996, pp. 1-71.
Network Working Group, Standards Track, "IP Mobility Support," C. Perkins, Editor, IBM, Oct. 1996, pp. 1-31.

* cited by examiner

*Primary Examiner*—Steven Nguyen
(74) *Attorney, Agent, or Firm*—Kam T. Tam; Sandra L. Godsey; Thomas R. Rouse

(57) ABSTRACT

Method and apparatus for resolving incompatibilities between system elements in a communication system supporting Mobile Internet Protocol communications. The method providing both forward and backward compatibility between system elements having different versions of a same protocol and/or different protocols. In one embodiment, the method adjusting the number of call registration extensions between system elements.

3 Claims, 8 Drawing Sheets

200
START
202
PDSN RECEIVES HA VERSION IDENTIFICATION?
YES
NO
204
HA SUPPORTS VERSION 2
YES
NO
UNKNOWN
212
RETAIN ADDITIONAL EXTENSIONS
REMOVE ADDITIONAL EXTENSIONS
206
208
RETAIN ADDITIONAL EXTENSIONS
210
CONTINUE REGISTRATION
END

--PRIOR ART--

--PRIOR ART--

METHOD AND APPARATUS FOR PROVIDING COMPATIBILITY BETWEEN ELEMENTS OF A WIRELESS COMMUNICATION SYSTEM

BACKGROUND

1. Field

The present invention relates to wireless communication systems generally and specifically, to methods and apparatus for handoff for a packet data service.

2. Background

Mobile Internet Protocol (IP) is intended to enable nodes to move from one IP subnet to another, from one Ethernet segment to another, and from an Ethernet segment to a wireless LAN. The intent is for the IP address of a Mobile Node (MN) to remain the same over a given movement. As long as node movement does not occur between points of attachment on different IP subnets, link-layer mechanisms for mobility (i.e., link-layer handoff) may offer faster convergence and far less overhead than Mobile IP. A problem exists in providing compatibility between different protocols, and the various revisions of such protocols. Specifically, as new protocols are introduced, they may create conflicts with previous revisions and protocols.

There is a need, therefore, for compatibility between different wireless communication and data transfer protocols. Specifically, there is a need for a backward and forward compatible interface for Mobile IP protocols.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The following discussion develops the exemplary embodiments by first presenting a network implementing mobile IP to communicate data to and from a mobile node. Then a spread-spectrum wireless communication system is discussed. Next, the mobile IP network is shown implemented in the wireless communication system. The messages are illustrated that register a mobile node with a home agent thereby enabling IP data to be sent to and from the mobile node. Finally, methods for reclaiming resources at the home agent are explained.

Note that the exemplary embodiment is provided as an exemplar throughout this discussion; however, alternate embodiments may incorporate various aspects without departing from the scope of the present invention. Specifically, the various embodiments are applicable to a data processing system, a wireless communication system, a mobile IP network and any other system desiring efficient use and management of resources.

The exemplary embodiment employs a spread-spectrum wireless communication system. Wireless communication systems are widely deployed to provide various types of communication such as voice, data, and so on. These systems may be based on Code Division-Multiple Access (CDMA), Time Division Multiple Access (TDMA), or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Figure 1:
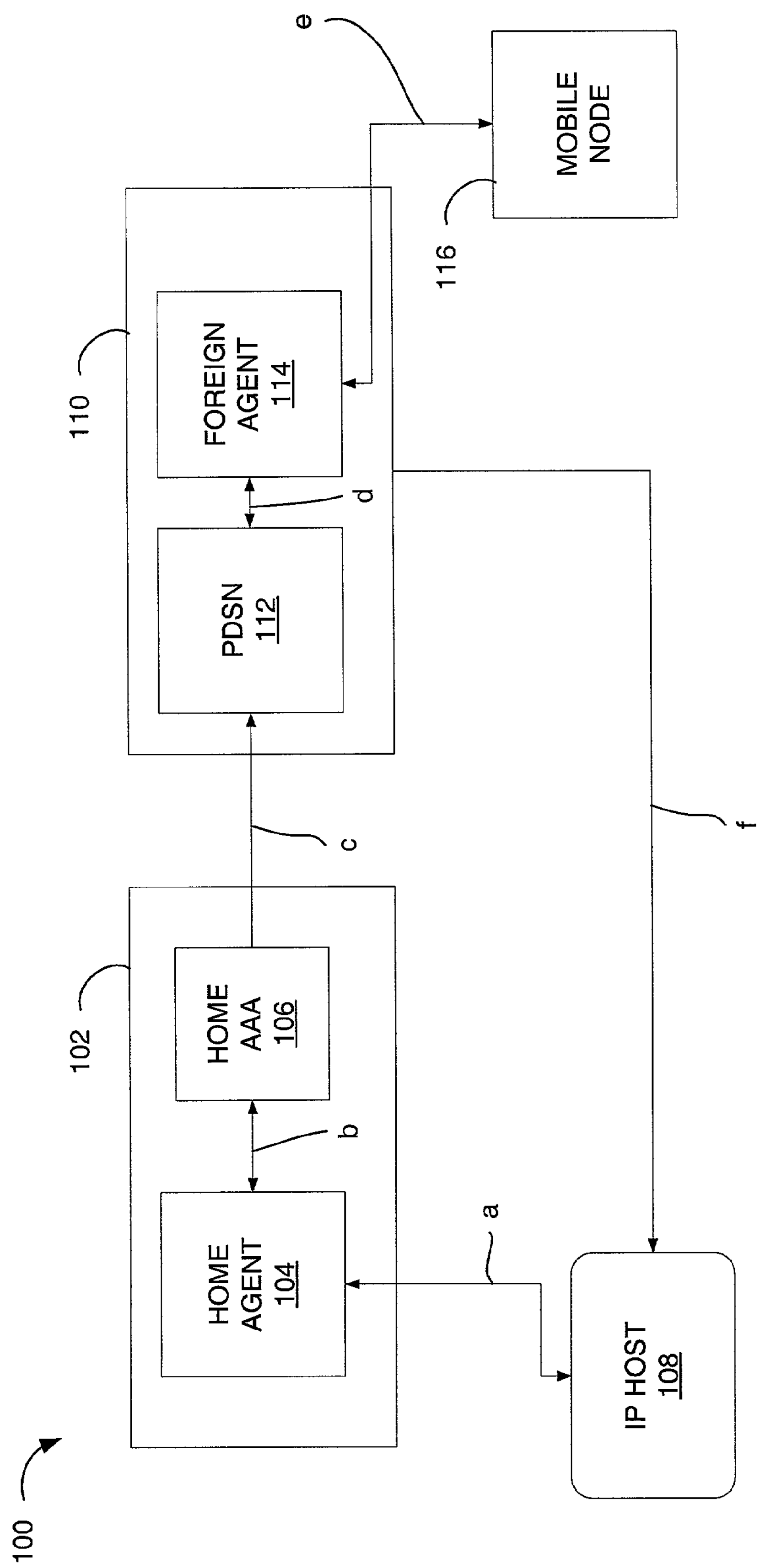
FIG. 1 is a block diagram of a communication system supporting Mobile IP.

Each standard specifically defines the processing of data for transmission from base station to mobile, and vice versa. As an exemplary embodiment the following discussion considers a spread-spectrum communication system consistent with the cdma2000 standard of protocols. Alternate embodiments may incorporate another standard. A communication system 100 according to one embodiment is shown in FIG. 1. The communication system 100 includes both wireless portions and Internet Protocol (IP) portions. The terminology used to describe the various elements of the system 100 is intended to facilitate understanding Mobile IP as described herein. A home network 102 for a Mobile Node (MN) includes Home Agent (HA) 104 and Home Agent Authentication, Administration, and Accounting (HAAA) unit 106. Note that authentication is the process of verifying, such as by the use of cryptographic techniques, the identity of the originator of a message.

The home network 102 is in communication with an IP host 108. As illustrated, the MN 116 has moved to a foreign system 110, which includes a Packet Data Service Node (PDSN) 112 and a Foreign Agent (FA) 114.

A MN, such as MN 116, is a host or router that changes its point of attachment from one network or subnetwork to another. A MN may change its location without changing its IP address; a MN may continue to communicate with other Internet nodes at any location using its (constant) IP address, assuming link-layer connectivity to a point of attachment is available.

An HA is a router on a MN home network which tunnels datagrams for delivery to the MN when the MN is away from home, and maintains current location information for the MN. A FA is a router on a MN visited network which provides routing services to the MN while registered. The FA detunnels and delivers datagrams to the MN that was tunneled by the MN's home agent. For datagrams sent by a MN, the FA may serve as a default router for registered MNs.

A MN 116 is given a long-term IP address on a home network 102. This home address, i.e., IP address of the MN, is administered in the same way as a "permanent" IP address is provided to a stationary host. When away from its home network 102 a "care-of address" is associated with the MN 116, which reflects the MN's current point of attachment. The care of address is the IP address for the end of a tunnel. The MN 116 uses the home address as the source address of IP datagrams sent from the MN 116.

A Home Network, such as home network 102, is a network, possibly virtual, having a network prefix matching that of a MN's home address. Note that standard IP routing mechanisms will deliver datagrams destined to a MN's Home Address to the mobile node's Home Network. A Foreign Network is then any network other than the Home Network. Note that these terms are per MN.

When away from home, Mobile IP uses protocol tunneling to hide a MN's home address from intervening routers between its home network and its current location. The tunnel terminates at the MN's care-of address. The care-of address must be an address to which datagrams can be delivered via conventional IP routing. At the care-of address, the original datagram is removed from the tunnel and delivered to the MN.

A tunnel is the path followed by a datagram while it is encapsulated. The model is that, while it is encapsulated, a datagram is routed to a knowledgeable decapsulating agent, which decapsulates the datagram and then correctly delivers it to its ultimate destination.

Datagrams to the MN 116 are provided from IP host 108 to the home network 102 on path a. The datagrams are sent using standard IP routing techniques. The datagram is received and intercepted by the HA 104 and tunneled to the care of address. The HA 104 passes the tunneled datagram to foreign network 110 via path c. The FA 114 detunnels the datagram for delivery to the MN 116. The FA 114 sends the datagram to the MN 116 via path e.

While in communication with the foreign network 110, datagrams from the MN 116 are sent via standard IP routing techniques from foreign network 110 to the IP host 108. Note that the MN 116 is illustrated outside of the foreign network 110 for clarity of operation; however, the MN 116 is operating with in a geographical or virtual area serviced by the foreign network 110.

The operation of system 100 as described so far is consistent with that specified by RFC 2002 entitled "IP Mobility Support" edited by C. Perkins, and dated October 1996, as well as that specified by RFC 3220 entitled "IP Mobility Support for IPv4" edited by C. Perkins and dated Jan. 2002. Both of these documents are promulgated by the Internet Engineering Task Force or IETF.

Various differences are presented in RFC 3220 which results in potential conflicts between systems and compatibility issues between various revisions of a given system. These differences are presented as exemplars of compatibility issues related to wireless communication and Mobile IP specifically; however, a variety of other differences and incompatibilities are considered with respect to the present discussion.

Original Specification

As specified in RFC 2002, Mobile IP registration provides a flexible mechanism for MNs to communicate current reachability information to the HA. It is the method by which MNs request forwarding services when visiting a foreign network, inform the HA of a current care-of address, renew a registration which is due to expire, and/or deregister on return home. Registration messages exchange information between a MN, (optionally) a FA, and the HA. Registration creates or modifies a mobility binding at the HA, associating the MN's home address with the MN's current care-of address for a specified Lifetime.

Several other (optional) capabilities are available through the registration procedure, which enable a mobile node to maintain multiple simultaneous registrations, so that a copy of each datagram will be tunneled to each active care-of address, deregister specific care-of addresses while retaining other mobility bindings, and discover the address of a HA if MN is not configured with this information. Mobile IP defines two different registration procedures, one via a FA that relays the registration to the MN 's HA, and one directly with the MN's HA. The following rules determine which of these two registration procedures to use in any particular circumstance. If a mobile node is registering a FA care-of address, the MN must register via that FA. If a MN is using a co-located care-of address, and receives an Agent Advertisement from a FA on the link on which the MN is using this care-of address, the MN should register via that FA (or via another FA on this link) if the 'R' bit is set in the received Agent Advertisement message. If a MN is otherwise using a co-located care-of address, the MN must register directly with its HA. If a MN has returned to its home network and is (de)registering with its HA, the MN must register directly with its HA. Both registration procedures involve the exchange of Registration ReQuest (RRQ) and Registration RePly (RRP) messages. When registering via a FA, the registration procedure requires the following four messages:

a) The MN sends an RRQ to the prospective FA to begin the registration process.
b) The FA processes the RRQ and then relays it to the HA.
c) The HA sends an RRP to the FA to grant or deny the Request, i.e. RRQ.
d) The FA processes the RRP and then relays it to the MN to inform it of the disposition of its Request.

When the MN instead registers directly with its HA, the registration procedure requires only the following two messages:

a) The mobile node sends a Registration Request to the home agent.
b) The home agent sends a Registration Reply to the mobile node, granting or denying the Request.

The registration messages use the User Datagram Protocol (UDP). A nonzero UDP checksum should be included in the header, and must be checked by the recipient.

Each MN, FA, and HA must be able to support a mobility security association for mobile entities, indexed by their Security Parameter Index (SPI) and IP address. In the case of the MN, this must be its Home Address. Registration messages between a MN and its HA must be authenticated with the Mobile Node-Home Authentication Extension (MN-HA Authentication Extension). The MN-HA Authentication Extension immediately follows all non-authentication Extensions, except those FA-specific Extensions which may be added to the message after the MN computes the authentication.

A MN registers with its HA using an RRQ message so that the HA can create or modify a mobility binding for that MN (e.g., with a new lifetime). The RRQ request may be relayed to the HA by the FA through which the MN is registering, or it may be sent directly to the HA in the case in which the MN is registering a co-located care-of address.

The fixed portion of the RRQ is followed by one or more of the Extensions. The MN-HA Authentication Extension must be included in all RRQ requests. A mobility agent returns an RRP message to a MN which has sent a RRQ message. If the MN is requesting service from a FA, that FA will receive the RRP from the HA and subsequently relay it to the MN. The RRP message contains the necessary codes to inform the MN about the status of its RRQ request, along with the lifetime granted by the HA, which may be smaller than the original RRQ request.

Exactly one MN-HA Authentication Extension must be present in all RRQ requests and RRP replies, and is intended to eliminate problems which result from the uncontrolled propagation of remote redirects in the Internet. The location of the extension marks the end of the authenticated data. Further, additional extensions are supported, such as non-authentication extensions used by the FA, MN-FA Authentication Extensions, and/or MN-AAA Authentication Extensions. Note that the MN is required to include both the MN-HA Authentication Extension and the MN-AAA Authentication Extension in the RRQ message to the PDSN and FA during Mobile IP registration. MN-AAA Authentication Extension is specified in RFC3012. Note that some standards and standard versions prior to IS-95, such as the standard identified as IS-835-A, have the requirement. Additionally, this allows the mobile to send both authentication extensions. The IS-835-A standard version is more restrictive than the IS-835-B standard version, requiring the mobile to send both authentication extensions. Further, the PDSN and FA are required to include both Extensions in the RRQ message sent to the HA.

Revised Specification

In contrast to the specifications of RFC 2002, the RFC 3220 specifies that the PDSN and FA send only one authentication extension, specifically, the MN-HA Authentication Extension. Each MN, FA, and HA must be able to support a mobility security association for mobile entities, indexed by SPI and IP address. In the case of the MN, this must be its Home Address. Registration messages between a MN and HA must be authenticated with an "authorization-enabling extension," such as the MN-HA Authentication Extension. This extension must be the first authentication extension; other foreign agent-specific extensions may be added to the message after the mobile node computes the authentication.

Authorization-enabling extension is an authentication which makes a (registration) message acceptable to the ultimate recipient of the registration message. An authorization-enabling extension must contain an SPI. As used in RFC 3220, authorization-enabling extension refer to authentication extensions that enable the Registration Request message to be acceptable to the home agent. Using additional protocol, it may be possible for the MN to provide authentication of its registration to the HA, by way of another authenticating entity within the network that is acceptable to the HA.

A MN registers with the HA using an RRQ message so that the HA can create or modify a mobility binding for that MN (e.g., with a new lifetime). The RRQ may be relayed to the HA by the FA through which the MN is registering, or it may be sent directly to the HA in the case in which the MN is registering a co-located care-of address.

Exactly one authorization-enabling extension must be present in all RRQs, and also in all RRPs generated by the HA. The MN-HA Authentication Extension is an authorization-enabling for registration messages. This requirement is intended to eliminate problems which result from the uncontrolled propagation of remote redirects in the Internet. The location of the extension marks the end of the authenticated data.

As specified in the RFC 3220, if the HA receives more than one authentication extension, i.e, authorization-enabling extension, the HA will reject the MN's registration request and should send an RRP to the MN via FA/PDSN with a designated error code. In one embodiment the error code is identified as 131, indicating that the MN failed authentication.

Current Solution

For keeping the backward compatibly with the original specification, i.e., RFC 2002, the following method is supported by the 3GPP2 TSG-P. At initial registration, the MS includes the MN-HA and the MN-AAA Authentication Extensions. To support backward compatibility with previous versions, 3GPP2 "Authorization Enabling Extensions" attribute is added from the Home AAA (RADIUS) server to the PDSN indicating whether Authorization Enabling Extensions can be removed.

Figure 2:
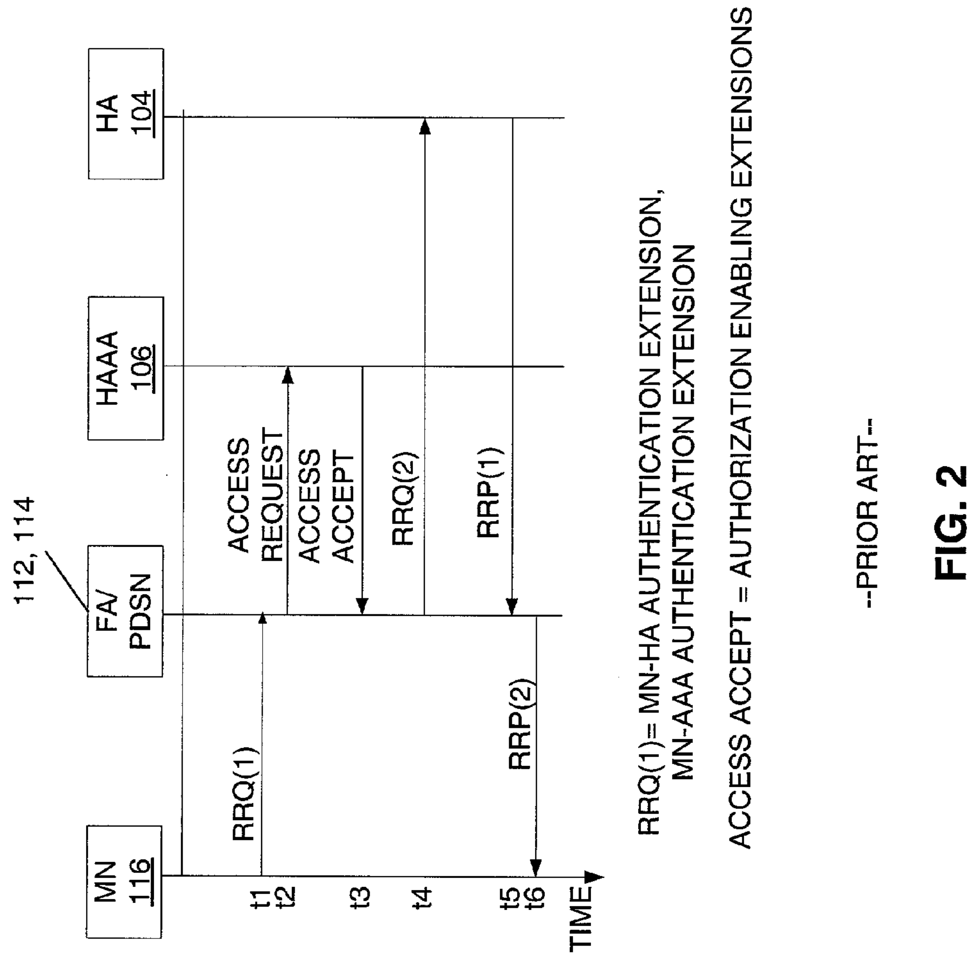
FIG. 2 is a timing diagram illustrating a call registration in a communication system utilizing Authentication Enabling Extensions.

The PDSN handles authentication extensions as follows. If the PDSN receives the 3GPP2 "Authorization Enabling Extensions" attribute from the Home AAA (RADIUS) server, the PDSN shall not remove any extensions following the MN-HA Authentication extension. Note that the attribute is described in a recent ballot resolution version of IS-835-B. The attribute is described hereinbelow. Also, note that the RADIUS server is the AAA server using the RADIUS protocol. This scenario is illustrated in FIG. 2. If the PDSN does not receive the attribute, it removes the MN-AAA Authentication Extension from the RRQ after the completion of the Mobile Node Authentication through the AAA infrastructure, as specified by Mobile IP RFC 3220 prior to forwarding the RRQ to the HA.

FIG. 2 illustrates the processing within system 100, wherein system elements are represented on the horizontal axis and the vertical axis represents time. At time t1 the MN 116 sends an RRQ identified as RRQ(1), including both an MN-HA Authentication Extension and an MN-AAA Authentication Extension. The RRQ(1) is received by PDSN 112 and/or FA 114, which in response send(s) an access request message to HAAA 106 at time t2. At time t3 the HAAA 106 responds with an access accept message. The access accept message includes the Authorization Enabling Extensions. At time t4, the PDSN 112 and/or FA 114 send(s) an RRQ identified as RRQ(2) to the HA 104. At time t5 HA 104 responds with an RRP message identified as RRP(1). The PDSN 112 and/or FA 114 respond(s) with an RRP message identified as RRP(2) at time t6.

Figure 3:
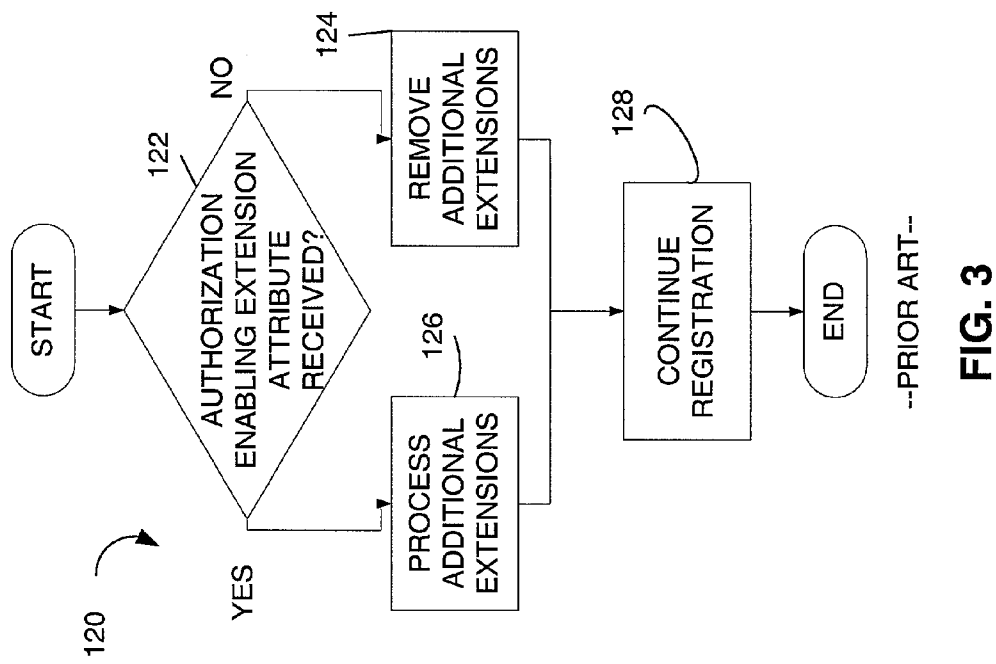
FIG. 3 is a flow chart of the call registration process utilizing Authentication Enabling Extensions.

FIG. 3 illustrates the process 120 for the decision making process. If an Authorization Enabling Extension attribute is received at decision diamond 122, processing continues to step 126 to process the additional extensions. If the attribute is not received, processing continues to step 124 to remove the additional extensions. Both processing paths continue the registration process at step 128.

Depending on the capabilities of the system elements, the solution of FIGS. 2 and 3 may present other problems. The various scenarios are described in the following table. With respect to the system elements, generally IS-835-A complies with RFC 2002, while IS-835-B is intended to comply with RFC 3220. Note that these standards and versions are provided as examples of system configurations. Alternate embodiments may include any of a variety of standards, versions, system components and configurations.

TABLE 1

Various Scenarios Considering Different Configurations

| FA/PDSN Release | Home AAA Release | HA Release | Comments |
|---|---|---|---|
| IS-835-B | IS-835-B | RFC2002 RFC3220 | No problem, as both Home AAA and FA/PDSN are Release B. The Home AAA instructs when to remove the HA-AAA Authentication Extension. |
| IS-835-A | 1S-835-A/B | RFC2002 | Both extensions will be sent according to the IS-835-A because the FA/PDSN complies with IS-835-A. |
| IS-835-B | IS-835-A | RFC2002 | May introduce problems, as the FA/PDSN only sends the MN-HA Authentication Extension because Release-A Home AAA cannot send the "Authorization Enabling Extension" attribute. For HA complying with both REC 2002 and IS-835-A authentication extensions are expected but not received. |
| IS-835-A | IS-835-A/B | RFC3220 | Still a problem, as the HA may receive an extension not allowed under RFC 3220. |
| IS-835-B | IS-835-A | RFC3220 | The FA/PDSN does not receive the "Authorization Enabling Extensions" attribute, but rather only sends the MN-HA Authentication Extension to the HA. |

Typically, the HA and HAAA are in a same carrier's domain, and the HAAA knows or has access to the version of HA. Therefore, for both backward and forward compatibility, it is desirable that the HAAA indicates the HA's version to the FA/PDSN instead of sending the "Authorization Enabling Extensions" attribute. In addition, if the HA version is unknown to the HAAA, or the FA/PDSN doesn't receives this new attribute, both authentication extensions will be sent from the FA/PDSN to the HA.

Figure 4:
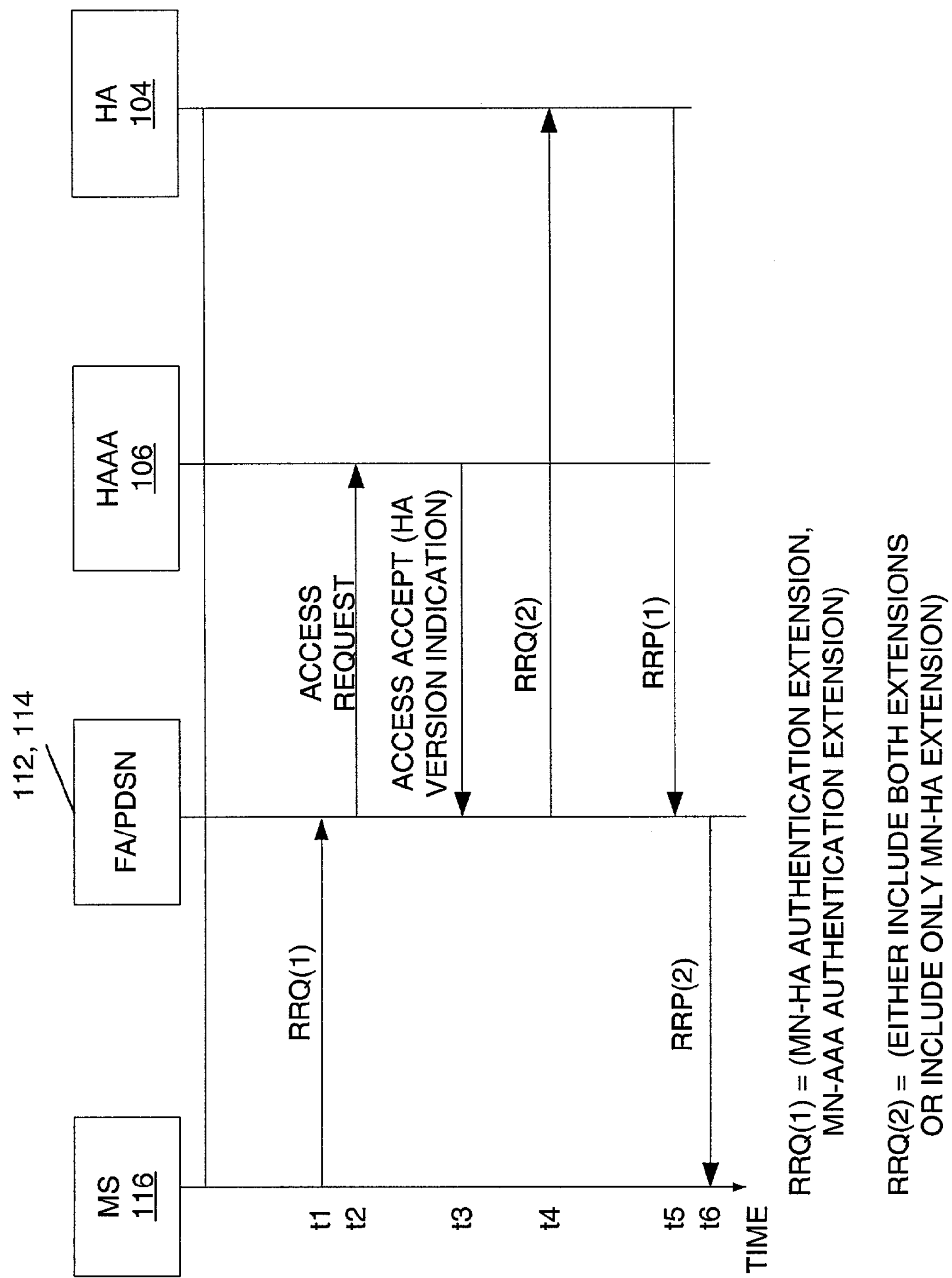
FIG. 4 is a timing diagram illustrating a call registration in a communication system utilizing a version identification message.

FIG. 4 illustrates a scenario for provision of the HA version information. The vertical axis represents time, while the horizontal axis represents the system elements. At initial registration, the MS includes the MN-HA, and the MN-AAA Authentication Extensions in an RRQ message identifies as RRQ(1) sent at time t1 to the FA and/or PDSN. The FA and/or PDSN send(s) an access request to the HAAA at time t2. To support backward compatibility with previous versions, the HAAA responds to the access request by providing an access accept to the FA and/or PDSN at time t3. The access request identifies the HA version. In one embodiment, the HAAA sends a version identifier consistent with the 3GPP2 "HA Version Indication" attribute. The attribute information indicates the version of the HA with respect to RFC2002 or RFC3220. Please refer to the attribute information provided hereinbelow. In one embodiment, the RFC2002 HA is equivalent to IS-835-A and RFC3220 HA is equivalent to IS-835-B.

Figure 5:
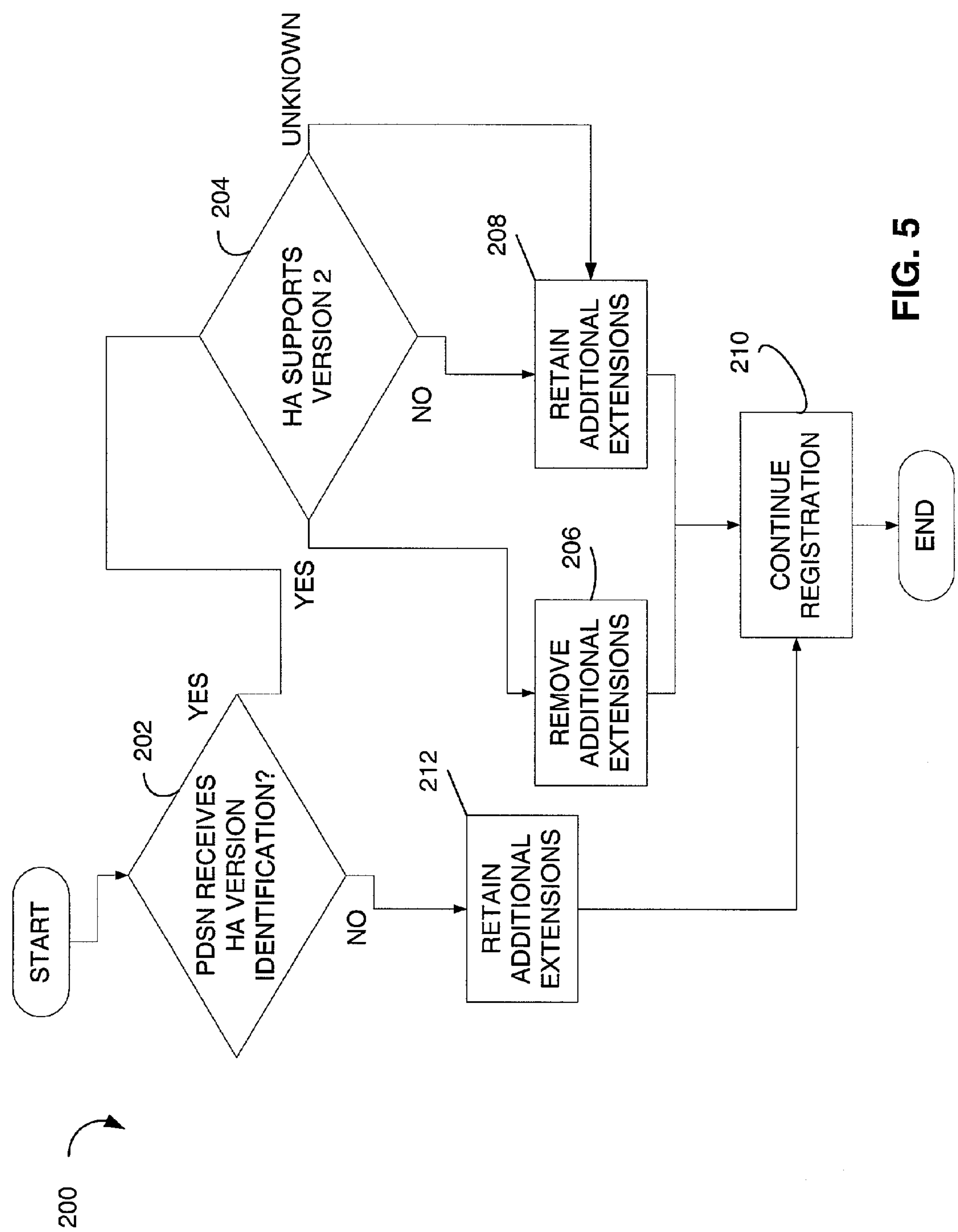
FIG. 5 is a flow chart of a call registration process supporting a version identification message.

For a Release-B PDSN (i.e., supporting RFC 3220) handles authentication extensions as illustrated in the flow chart of FIG. 5. The process 200 begins at decision diamond 202 to determine if an HA version identification, such as an attribute discussed hereinabove, is received from a HAAA. The version identification may be included in an access accept message as illustrated in FIG. 4. When the HA version identification is received, processing continues to decision diamond 204. When the version identification is not received, processing continues to step 212 to retain the additional extensions contained in an RRQ message from a MN. From decision diamond 204, when the version identification indicates that the HA supports the RFC 3220 version infrastructure, as specified by Mobile IP RFC 3220.

Returning to decision diamond 204, when the PDSN receives the version identification, such as the 3GPP2 "HA Version Indication" attribute, from the HAAA server indicating that the HA complies with RFC2002 (version 1), the PDSN retains any additional extensions at step 208 following the MN-HA Authentication extension. Similarly, when the PDSN receives the version identification, such as the 3GPP2 "HA Version Indication" attribute, from the HAAA server indicating that the HA version is unknown, the PDSN retains any extensions at step 208 following the MN-HA Authentication extension.

The use of a version identification, such as the "HA Version Indication" attribute, in addition to or in place of the "Authorization-Enabling Extension" attribute provides forward compatibility to distinguish future HA versions from current HA versions. For example, future FA and HA may support Mobile IP Registration Revocation [draft-ietf-mobileip-reg-revok-02.txt]. Via the "HA Version Indication" attribute, a revocation-capable FA will avoid sending revocation message to HA that doesn't support revocation.

The method as illustrated in FIGS. 4 and 5 provides a solution when the FA and/or PDSN, as well as the HAAA support a new version (version 2), such as the RFC 3220, while the HA supports the previous version (version 1), such as RFC 2002. However, a problem still exists when the FA and/or PDSN supports the new version (version 2), the HAAA supports the old version (version 1), and the HA supports the new version (version 2). For this configuration, the HAAA does not support the new attribute, i.e., version identification, and therefore, the FA and/or PDSN will send both extensions to the HA. Alternate embodiments are presented to avoid this problem as well as others created by configurations having inconsistent revisions of hardware and software.

Figure 6:
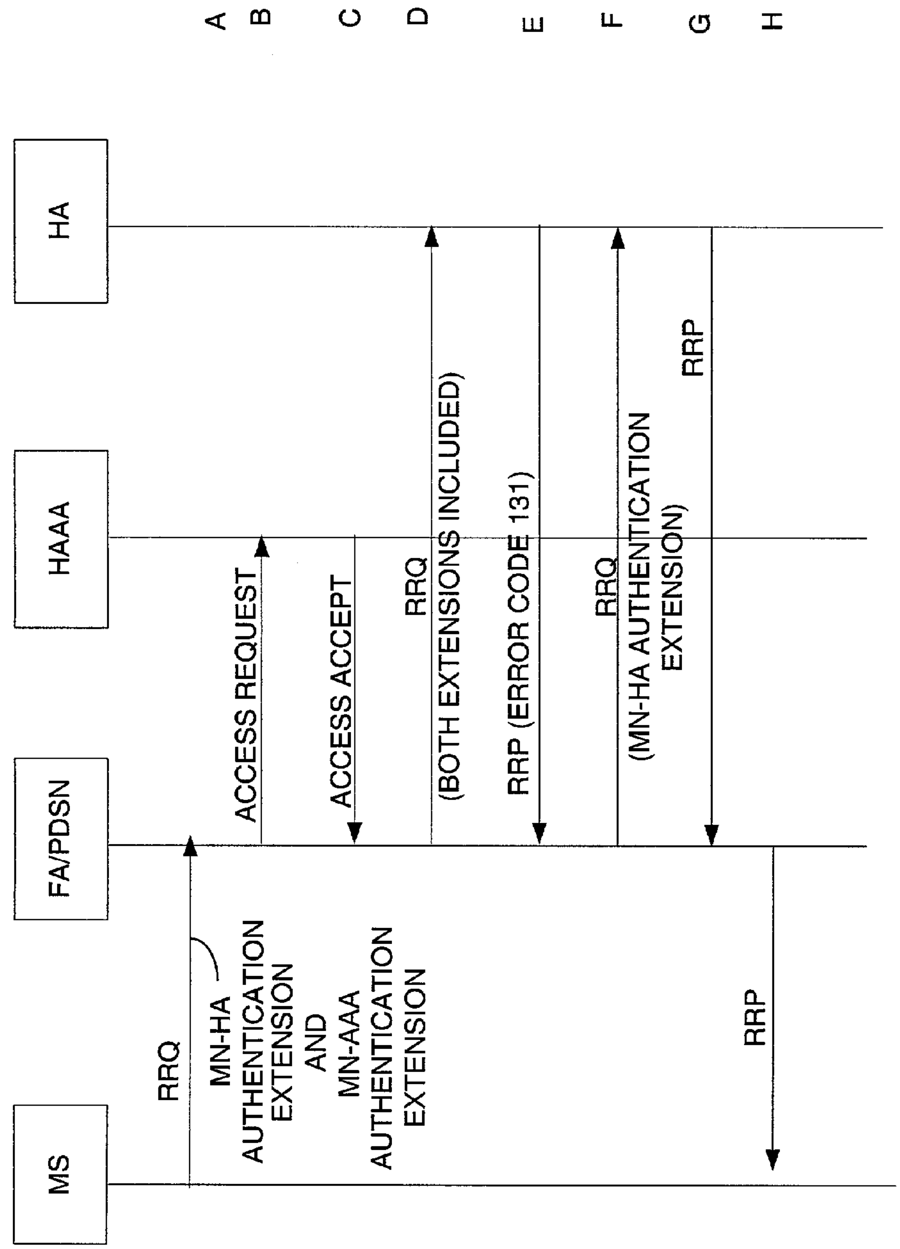
FIGS. 6-9 are timing diagrams illustrating various call registration processes.

One embodiment is illustrated in FIG. 6, and is detailed as follows:

a) The MS sends an RRQ to FA/PDSN including both the MN-HA Authentication Extension and MN-AAA Authentication Extension.

b) The FA/PDSN sends an Access Request message to the HAAA.

c) The HAAA responds with an Access Accept. In this example, the HAAA supports RFC 2002, and therefore does not know how to handle the new attribute "HA Version Indication."

d) The FA/PDSN sends an RRQ to the HA including both the MN-HA Authentication Extension and MN-AAA Authentication Extension.

e) As the HA complies with the RFC3320, the HA sends an RRP with an error code, such as error code 131 indicating that the MN failed authentication, to the FA/PDSN.

f) The FA/PDSN looks at the RRP to retrieve the error code 131, and will send another RRQ to the HA including only the MN-HA Authentication Extension.

g) The HA sends an RRP to the FA/PDSN.

h) The FA/PDSN passes the RRP to the MS.

In this embodiment the FA resends an RRQ omitting the MN-AAA Authentication Extension upon receipt of an RRQ with an error code. The MN, however, need only send the RRQ once, thus saving air resources.

Figure 7:
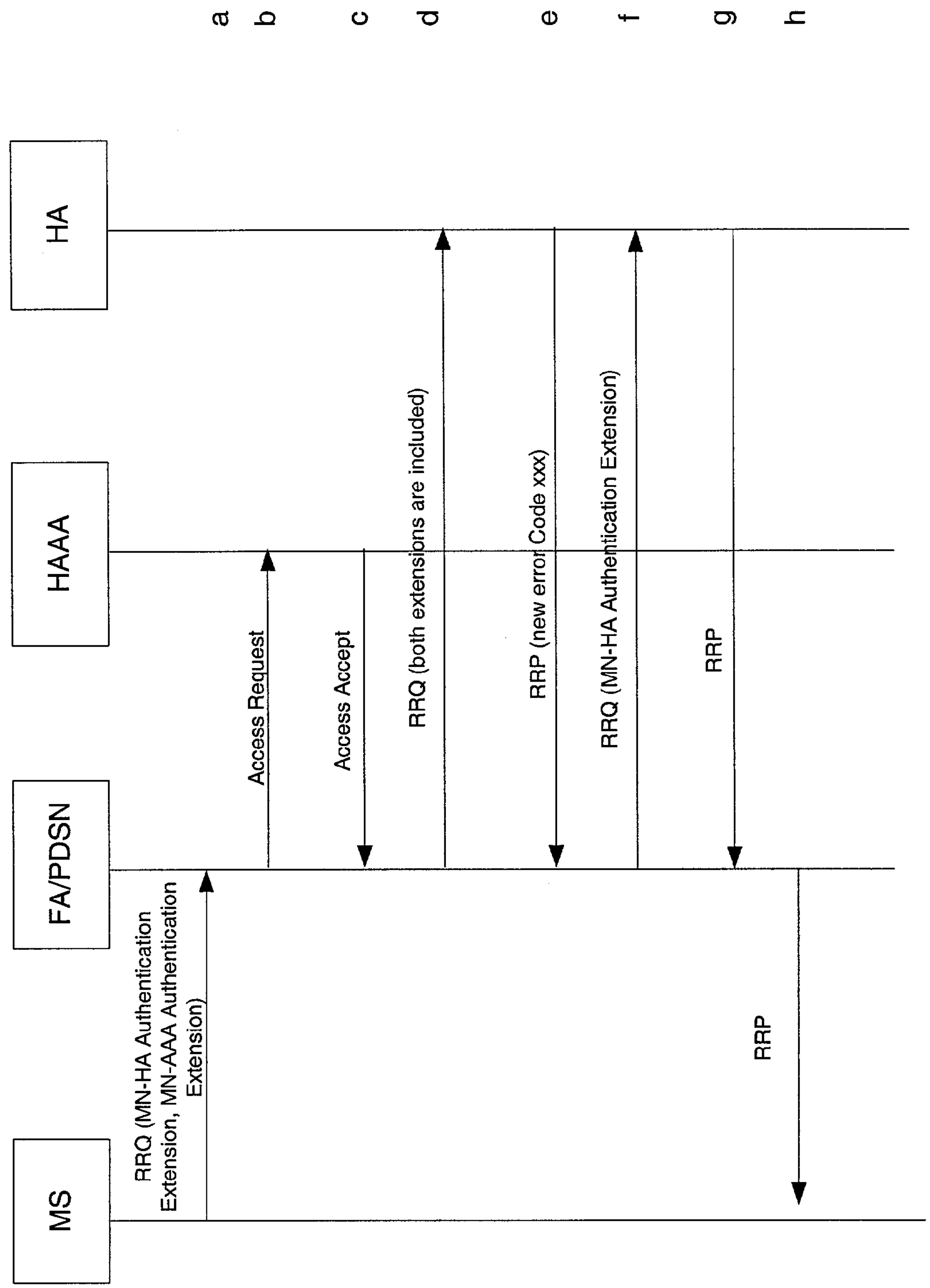

An alternate embodiment is illustrated in FIG. 7, and is detailed as follows:

a) The MN sends an RRQ to the FA/PDSN with both the MN-HA Authentication Extension and MN-AAA Authentication Extension included.
b) The FA/PDSN sends an Access Request to the HAAA.
c) The HAAA responds with an Access Accept message. In this example, the HAAA supports RFC 2002, and therefore does not support the new attribute "HA Version Indication."
d) The FA/PDSN sends an RRQ to the HA with both the MN-HA Authentication Extension and the MN-AAA Authentication Extension included.
e) Because the HA supports RFC3320, an RRP is sent with the new error code set to a value indicating only one extension is allowed. The RRP is sent to the FA/PDSN.
f) Upon receiving the new error code, the FA/PDSN will send another RRQ to the HA with only the MN-HA Authentication Extension included.
g) The HA sends an RRP to the FA/PDSN.
h) The FA/PDSN passes the RRP to the MS.

Note that the HA and the FA supporting the new error code is not consistent with RFC 3220. A modification to RFC 3220 would allow such an embodiment. The MN, however, need only send the RRQ once, saving air resources.

Figure 8:
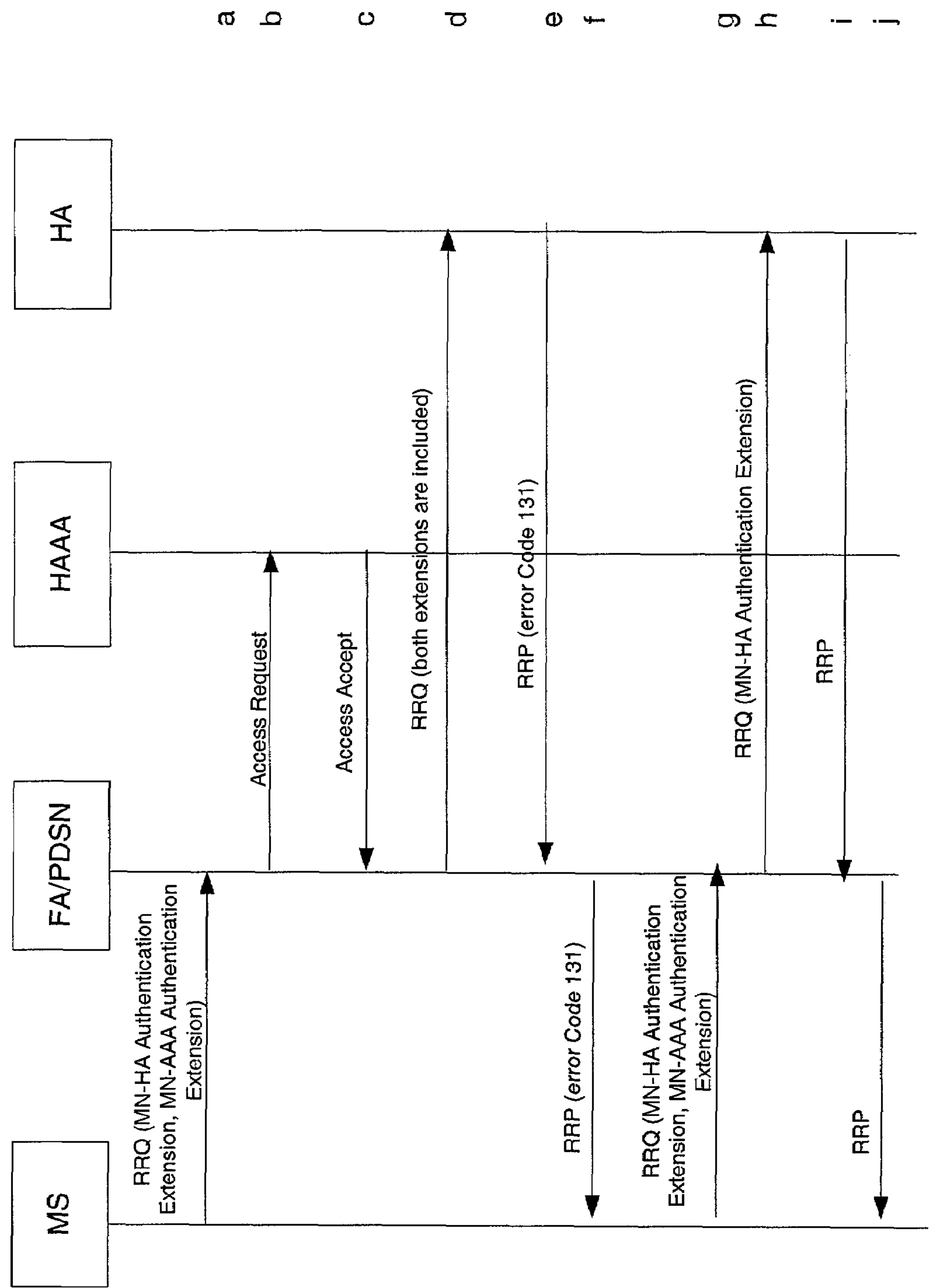

Still another embodiment is illustrated in FIG. 8, and detailed as follows, wherein the MN needs to know the authentication has failed, and, as the MN will retry the registration.

a) The MS sends RRQ to FA/PDSN with both the MN-HA Authentication Extension and MN-AAA Authentication Extension included.
b) The FA/PDSN sends Access Request to HAAA.
c) The HAAA responses with Access Accept. In this example the HAAA complies with IS-835-A, and therefore it doesn't support the new attribute "HA Version Indication".
d) FA/PDSN sends RRQ to HA with both the MN-HA Authentication Extension and MN-AAA Authentication Extension included.
e) Because the HA complies with RFC3320, it will send RRP with the error code set to 131 (mobile node failed authentication) to the FA/PDSN.
f) The FA/PDSN passes the RRP to the MS with error code 131 and stores that the authentication failed information for the corresponding MS.
g) The MS re-sends RRQ to the FA/PDSN with both the MN-HA Authentication Extension and MN-AAA Authentication Extension included.
h) The FA/PDSN sends the RRQ to HA with only the MN-HA Authentication Extension included.
i) The HA replies with RRP to the FA/PDSN.
j) The FA/PDSN passes the RRP to the MS.

Here the MN resends the RRQ, resulting in increased registration latency. Additionally, the method of FIG. 8 adds complexity to the FA implementation in order to record the history of failed authentication for the MN. It also adds some complexity to the MN implementation, wherein the MN resends the RRQ upon receipt of the RRP with an error code, such as error code 131. Note also that the FA and the HA actions are in compliance with the requirements of RFC 3220.

Figure 9:
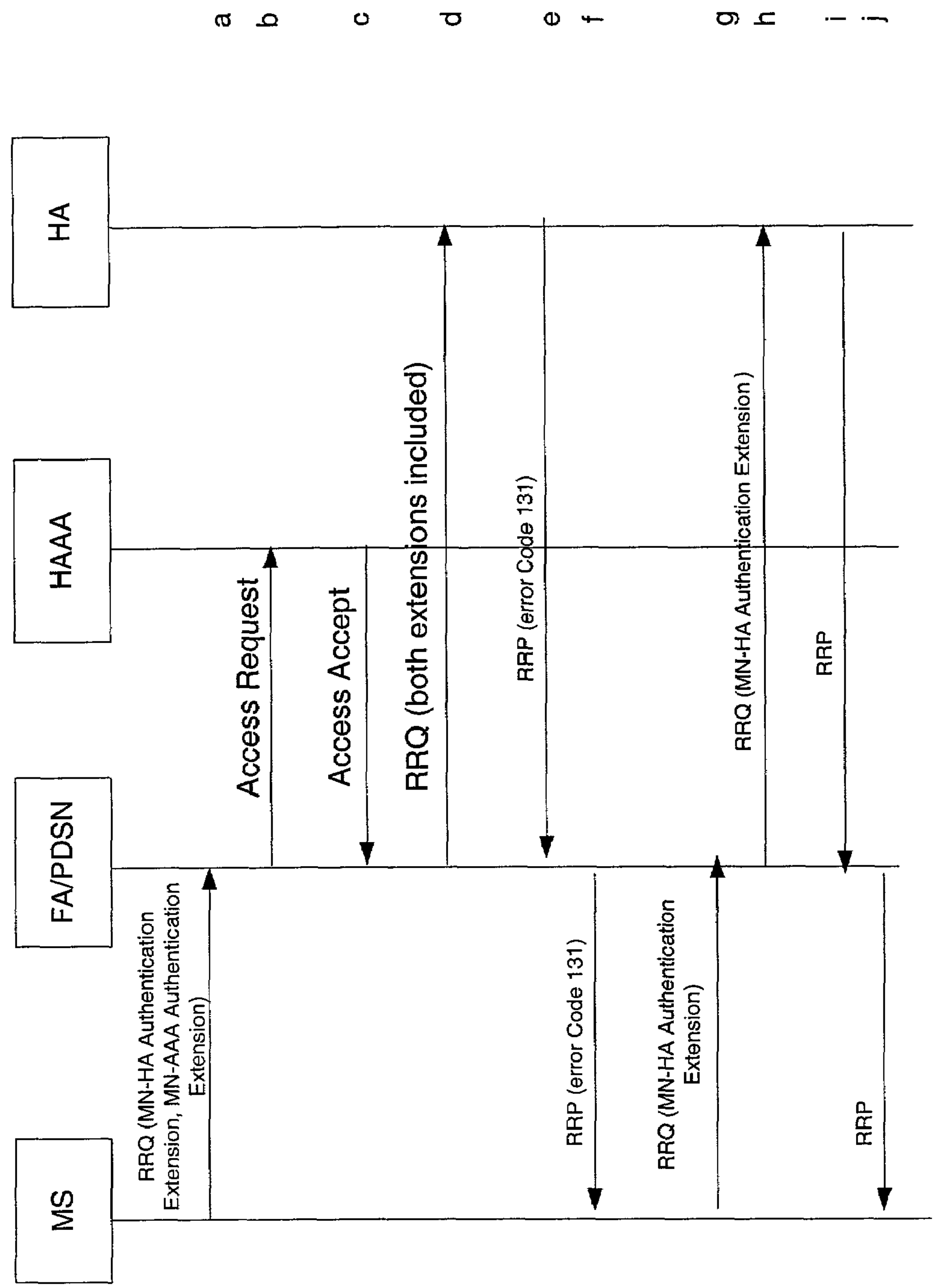

Yet another embodiment is illustrated in FIG. 9, and detailed as follows:

a) The MS sends an RRQ to the FA/PDSN with both the MN-HA Authentication Extension and MN-AAA Authentication Extension included.
b) The FA/PDSN sends an Access Request to the HAAA.
c) The HAAA responds with an Access Accept. In this example, the HAAA supports RFC 2002, and therefore does not support the new attribute "HA Version Indication."
d) The FA/PDSN sends an RRQ to the HA with both the MN-HA Authentication Extension and the MN-AAA Authentication Extension included.
e) Because the HA complies with RFC3320, it will send an RRP with an error code set, such as error code 131 identifying the MN failed authentication, to the FA/PDSN.
f) The FA/PDSN passes the RRP to the MS with the error code.
g) The MS re-sends the RRQ to the FA/PDSN with only the MN-HA Authentication Extension included.
h) The FA/PDSN sends the RRQ to the HA with only the MN-HA Authentication Extension included.
i) The HA replies with an RRP to the FA/PDSN.
j) The FA/PDSN passes the RRP to the MN.

In this embodiment, the MN resends the RRQ, resulting in increased registration latency. Additionally, this embodiment adds complexity to MN implementation for resending the RRQ without the MN-AAA Authentication Extension upon receipt of the RRP with the error code. Although the MN does not violate RFC 3220, it may violates the wireless standard. The FA and HA actions also comply with RFC 3220.

Authorizing Enabling Extensions

Note that the Authorizing Enabling Extensions attribute indicates the required action of the FA before relaying the RRQ message to the HA. This optionally appears in a RADIUS Access-Accept message. This attribute is to support backward compatibility with previous versions of the standard. This attribute is intended to be deprecated in a subsequent release. If there are no compatibility issues, this attribute is not required.

HA Version Indication

Indicates the version of the HA. This optionally appears in a RADIUS Access-Accept message. This attribute is to support backward compatibility with previous versions of this standard. If there are no compatibility issues, this attribute is not required.

While the description and embodiments presented hereinabove refer to an incompatibility between system elements regarding registration extensions, alternate embodiments may have other incompatibilities. Therefore, the embodiments presented hereinabove serve as exemplars, but the present invention extends to any of a number of situations wherein the system elements support different protocols and/or different versions of a same protocol. For example, a version identification may be used for resolution of any of a variety of incompatibilities. Similarly, various embodiments may share the responsibility for resolving incompatibilities between multiple system elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A method for call registration in a communication system supporting Mobile Internet Protocol communications, comprising:

receiving a version indication for a home agent, the version indication identifying a capability of the home agent, wherein the version indication is received from a home Authentication, Administration and Accounting unit;

in response to the version indication, determining if a number of registration extensions is consistent with the capability of the home agent; and sending a registration request message having the number of registration extensions.

2. A method for call registration in a communication system supporting Mobile Internet Protocol communications, comprising:

receiving a version indication for a home agent, the version indication identifying an authentication extension capability of the home agent in response to the version indication, determining if a number of authentication extensions is consistent with the capability of the home agent, wherein a received initial registration request message includes multiple authentication extensions; and sending a registration request message that includes one authentication extension.

3. An apparatus for call registration in a communication system supporting Mobile Internet Protocol communications, comprising:

means for receiving a version indication for a home agent, the version indication identifying an authentication extension capability of the home agent means for determining if a number of authentication extensions is consistent with the capability of the home agent in response to the version indication and means for sending a registration request message that includes one authentication extension in response to an initial registration request that includes multiple authentication extensions.

* * * * *